(12) United States Patent
Furue

(10) Patent No.: US 6,677,605 B2
(45) Date of Patent: Jan. 13, 2004

(54) RADIATION IMAGE DATA READING APPARATUS

(75) Inventor: Ryosuke Furue, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 77 days.

(21) Appl. No.: 10/002,111

(22) Filed: Dec. 5, 2001

(65) Prior Publication Data

US 2002/0043637 A1 Apr. 18, 2002

(30) Foreign Application Priority Data

Dec. 7, 2000 (JP) ...................................... 2000-372813

(51) Int. Cl.⁷ .............................................. G03B 42/02
(52) U.S. Cl. ..................... 250/584; 250/586; 250/589
(58) Field of Search ................................ 250/584, 585, 250/586, 589, 484.4

(56) References Cited

U.S. PATENT DOCUMENTS

| | | | |
|---|---|---|---|
| 4,258,264 A | 3/1981 | Kotera et al. | 250/484 |
| 4,276,473 A | 6/1981 | Kato et al. | 250/327.1 |
| 4,346,295 A | 8/1982 | Tanaka et al. | 250/327.2 |
| 4,387,428 A | 6/1983 | Ishida et al. | 364/414 |
| 4,485,302 A | 11/1984 | Tanaka et al. | 250/327.2 |
| 4,754,144 A * | 6/1988 | Seto | 250/589 |
| 5,237,177 A * | 8/1993 | Kimura | 250/580 |
| 5,308,994 A | 5/1994 | Ohta et al. | 260/589 |
| 5,530,259 A * | 6/1996 | Arakawa | 250/584 |
| 5,874,744 A * | 2/1999 | Goodman et al. | 250/584 |
| 6,313,477 B1 * | 11/2001 | Yasuda et al. | 250/587 |
| 6,455,868 B1 * | 9/2002 | Arakawa | 250/588 |

FOREIGN PATENT DOCUMENTS

| | | | |
|---|---|---|---|
| EP | 55-116340 | 9/1980 | A61B/6/00 |
| JP | 55-12429 | 1/1980 | G01T/1/10 |
| JP | 56-104645 | 8/1981 | A61B/6/00 |
| JP | 8-116435 | 5/1996 | H04N/1/401 |

* cited by examiner

Primary Examiner—Christopher W. Fulton
(74) Attorney, Agent, or Firm—Sughrue Mion, PLLC

(57) ABSTRACT

A radiation image data reading apparatus that receives a cassette that houses a substantially inflexible stimulable phosphor sheet with high rigidity therein with an opening at an end portion thereof for inserting and removing said sheet having radiation image data recorded thereon and reads out radiation image data from said stimulable phosphor sheet which has been removed from said cassette conveys the stimulable phosphor sheet from said opening of a received cassette at a constant speed by sheet conveyance means. As the stimulable phosphor sheet is being removed from the cassette, an excitation light main scan means performs a main scan in a direction substantially perpendicular to the direction of said conveyance, at a position close to said opening. The phosphorescent light emitted from the area of the sheet irradiated by the excitation light is detected by photoelectric detection means.

43 Claims, 7 Drawing Sheets

RADIATION IMAGE DATA READING APPARATUS

BACKGROUND OF THE INVENTION

1. Field of the Invention

The present invention relates to a radiation image data reading apparatus that obtains image signals which represent radiation image data by reading the phosphorescent light emitted from a stimulable phosphor sheet, having said radiation image data recorded thereon, when irradiated by an excitation light. In particular, the present invention relates to a radiation image data reading apparatus that reads radiation image data from a stimulable phosphor sheet housed in a cassette.

2. Description of the Related Art

There are known stimulable phosphors that store a portion of radiation energy when irradiated by radiation. These phosphors, when irradiated by an excitation light such as visible light or laser light, emit phosphorescent light corresponding to said radiation energy stored therein. Radiation image recording/reproducing systems that utilize stimulable phosphor sheets constructed of these stimulable phosphors layered on a substrate are in wide practical use.

These radiation image recording/reproducing systems record radiation image data onto these stimulable phosphor sheets by irradiating thereon radiation that has been passed through a subject such as a human body. Afterwards, said sheet is two-dimensionally scanned by an excitation light such as a laser light, causing phosphorescent light to be emitted from the portion irradiation by said excitation light. Image signals which represent the aforementioned radiation image data are obtained by reading this phosphorescent light with photoelectric reading means (see, for example, Japanese Unexamined Patent Publication Numbers 55(1980)-12429, 55(1980)-116340, and 56(1981)-104645).

The image signals obtained by these systems are subjected to image processes appropriate for image observation and reading, such as a gradation process and a frequency process, etc. The radiation image represented by said image signals are then recorded as a visible image for diagnosis onto film, or displayed on a CRT display apparatus. If an erasing light is irradiated onto a stimulable phosphor sheet following radiation image data readout therefrom, the energy stored thereon is released, and the sheet is again in a state in which it can record radiation image data, and repeated use thereof becomes possible.

In many cases, the aforementioned stimulable phosphor sheets are handled while housed in light-shielding cassettes. These cassettes house said stimulable phosphor sheets one at a time, and usually constitute a box portion having an opening for inserting and removing said stimulable phosphor sheet, and a lid portion for opening and closing said opening.

When photographing (recording) a radiation image employing a cassette as described above, said cassette is placed in a position where it will be irradiated by radiation that has, for example, passed through a subject. By this positioning, the stimulable phosphor sheet within the cassette is irradiated by said radiation, and a radiation image is recorded thereon.

The cassette, after a radiation image has been recorded on the stimulable phosphor sheet therein, is set in a radiation image data reading apparatus as disclosed, for example, in U.S. Pat. No. 5,308,994. The stimulable phosphor sheet is taken out of the cassette by said apparatus, and is subjected to a readout process of the radiation image data.

With regard to the aforementioned radiation image data reading apparatus utilized in the radiation image recording/reading system, as disclosed in U.S. Pat. Nos. 4,346,295 and 4,485,302 and Japanese Unexamined Patent Publication No. 8(1996)-116435, detecting the phosphorescent light emitted from the stimulable phosphor sheet from both sides thereof is being considered. This is to improve the detection efficiency of the emitted phosphorescent light and to obtain image signals with a good signal to noise ratio. In this case, the excitation light may be irradiated on one or both sides of the stimulable phosphor sheet.

With regard to the aforementioned stimulable phosphor sheet, the use of a rigid sheet that is substantially inflexible is also being considered. These so-called rigid type stimulable phosphor sheets differ from flexible stimulable phosphor sheets in that they themselves can be moved directly, obviating the need for sheet conveyance means such as an endless belt.

Existing radiation image data reading apparatuses as described above that read radiation image data from a stimulable phosphor sheet housed in a cassette, as disclosed in aforementioned U.S. Pat. No. 5,308,994 are structured to read flexible stimulable phosphor sheets. That is, they are structured to convey a stimulable phosphor sheet, after removal from the cassette receiving portion, along a conveyance path to a readout portion, then perform a main scan with an excitation light while moving said sheet in a sub-scan direction, reading the radiation image data thereby.

It is conceivable to house the aforementioned rigid type stimulable phosphor sheet in the cassette described above. However, in that case it becomes impossible to move said stimulable phosphor sheet in a sub-scan direction while bending it at the readout portion. A necessity arises to provide one sheet's worth of space in the readout portion along the sheet conveyance direction both before and after the main scan portion. Therefore, it was easy for radiation image data reading apparatuses that handled cassettes housing rigid type stimulable phosphor sheets therein to become excessively large.

SUMMARY OF THE INVENTION

The present invention has been developed in consideration of the circumstances described above, and it is an object of the present invention to miniaturize a radiation image data reading apparatus that handles cassettes housing rigid type stimulable phosphor sheets therein.

The radiation image data reading apparatus of the present invention realizes miniaturization of the apparatus by performing a sub-scan of a stimulable phosphor sheet by an excitation light while said sheet is being conveyed out from the cassette.

More specifically, the radiation image data reading apparatus of the present invention is a radiation image data reading apparatus that receives a cassette that houses a substantially inflexible stimulable phosphor sheet with high rigidity therein with an opening at an end portion thereof for inserting and removing said sheet having radiation image data recorded thereon and reads out radiation image data from said stimulable phosphor sheet which has been removed from said cassette comprising: a sheet conveyance means that conveys said stimulable phosphor sheet from the opening of said received cassette at a constant speed, at least during the readout of radiation image data; an excitation light main scan means that scans the stimulable phosphor sheet as it is being removed from said cassette with an excitation light in an excitation wavelength region of said sheet in a direction substantially perpendicular to the conveyance direction, at a position in the vicinity of said opening; and a photoelectric detection means that detects the phosphorescent light emitted from the portion of said sheet irradiated by the excitation light.

The aforementioned sheet conveyance means may change the conveyance speed at times other than that during which radiation image data is being readout. For example, it may be constructed to convey the stimulable phosphor sheet at a higher speed than the aforementioned constant speed until a front end of the stimulable phosphor sheet reaches the excitation light irradiation position.

With regard to the aforementioned excitation light main scan means of the radiation image data reading apparatus of the present invention, it is preferable that it be constructed of a line light source that irradiates the stimulable phosphor sheet with an excitation light in the form of a fan beam.

It is preferable that the aforementioned photoelectric detection means be constructed of line sensors. It is also desirable that the photoelectric detection means be constructed of a first photoelectric detection means that detects the phosphorescent light emitted from the portion of a stimulable phosphor sheet irradiated by the excitation light from one side of said sheet, and a second photoelectric detection means that detects said phosphorescent light from the other side of said sheet.

In addition, it is also desirable that the excitation light main scan means be constructed of a first excitation light main scan means that irradiates a stimulable phosphor sheet with an excitation light from one side thereof, and a second excitation light main scan means that irradiates said sheet from the other side thereof.

Meanwhile, with regard to the stimulable phosphor sheet to be used with the radiation image data reading apparatus of the present invention, it is desirable to utilize an anisotropic stimulable phosphor sheet that restricts the spreading of the excitation light and/or the phosphorescent light within said sheet.

Further, it is desirable that the radiation image data reading apparatus of the present invention be equipped with: a cassette holding portion for receiving a plurality of cassettes in a row; and a shift means for shifting the relative position between the sheet conveyance means, the excitation light main scan means as well as the photoelectric detection means and the aforementioned plurality of cassettes received in said cassette holding portion; wherein by shifting said relative position, it becomes possible to read out radiation image data from each of the stimulable phosphor sheets sequentially conveyed from said plurality of cassettes.

The radiation image data reading apparatus of the present invention is constructed to perform a main scan with an excitation light positioned near an insertion/removal opening of a received cassette when the rigid type stimulable phosphor sheet is being conveyed out of said received cassette while at the same time performing a sub-scan by said conveyance. Therefore, only one sheet's worth of space needs to be provided along the sheet removal direction beyond the main scan portion, thereby making sufficient miniaturization possible.

Note that if the radiation image data reading apparatus of the present invention utilizes line light sources that irradiate a stimulable phosphor sheet with an excitation light in the form of a fan beam as its excitation light main scan means, it becomes further advantageous in miniaturization of the apparatus. This is because such a construction, when compared with a case in which a single deflected excitation light beam performs a main scan on a stimulable phosphor sheet, obviates the necessity of providing a large space for the deflection of the excitation light beam.

In addition, if the radiation image data reading apparatus of the present invention utilizes line sensors as the photoelectric detection means, further miniaturization of the apparatus becomes possible. This is because such a construction, when compared with a case in which a large light collector is utilized to collect the emitted phosphorescent light then said light is guided to a photoelectric detection means such as a photo multiplier, simplifies the construction of the phosphorescent emitted light photoelectric detection portion.

If the photoelectric detection means is constructed of a first photoelectric detection means that detects the phosphorescent light emitted from the portion of a stimulable phosphor sheet irradiated by the excitation light from one side of said sheet, and a second photoelectric detection means that detects said phosphorescent light from the other side of said sheet, the detection efficiency of said emitted phosphorescent light is improved and it becomes possible to obtain readout image signals with a good signal to noise ratio by adding the output signals of the two photoelectric detection means.

If the excitation light main scan means is constructed of a first excitation light main scan means that irradiates a stimulable phosphor sheet with an excitation light from one side thereof, and a second excitation light main scan means that irradiates said sheet from the other side thereof, the excitation efficiency is improved, and it becomes possible to obtain readout image signals with a good signal to noise ratio.

In addition, if the radiation image data recording/reading system of the present invention utilizes an anisotropic stimulable phosphor sheet that restricts the spreading of the excitation light and/or the phosphorescent light within said sheet as its stimulable phosphor sheet, an effect of improving the image quality of the readout image is obtained.

That is, if the spreading of the excitation light within the sheet is suppressed, blurring of the readout image, due to diffused excitation light irradiating a portion of the sheet other than a specified scan area and causing phosphorescent light to be emitted therefrom, is prevented. Further, if spreading of the phosphorescent light within the sheet is suppressed, even if a line sensor which is formed with an extremely thin light receiving surface or the like is utilized, it becomes possible to guide said emitted phosphorescent light efficiently to said light receiving surface, thereby improving the phosphorescent light detection efficiency which in turn improves the image quality of the readout image represented by the output signals of the photoelectric detection means.

Further, in the case that the radiation image data reading apparatus of the present invention is equipped with: a cassette holding portion for receiving a plurality of cassettes in a row; and a shift means for shifting the relative position between the sheet conveyance means, the excitation light main scan means as well as the photoelectric detection means and the aforementioned plurality of cassettes received in said cassette holding portion; wherein by shifting said relative position, it becomes possible to read out radiation image data from each of the stimulable phosphor sheets sequentially conveyed from said plurality of cassettes, the need to remove and install cassettes one by one from and to the apparatus when it is desired to read out radiation image data from each of a plurality of cassettes is obviated. That is, it becomes possible to read out radiation image data from each stimulable phosphor sheet housed within a plurality of cassettes all together, thus realizing a more efficient readout process.

DESCRIPTION OF THE PREFERRED EMBODIMENTS

Figure 1:
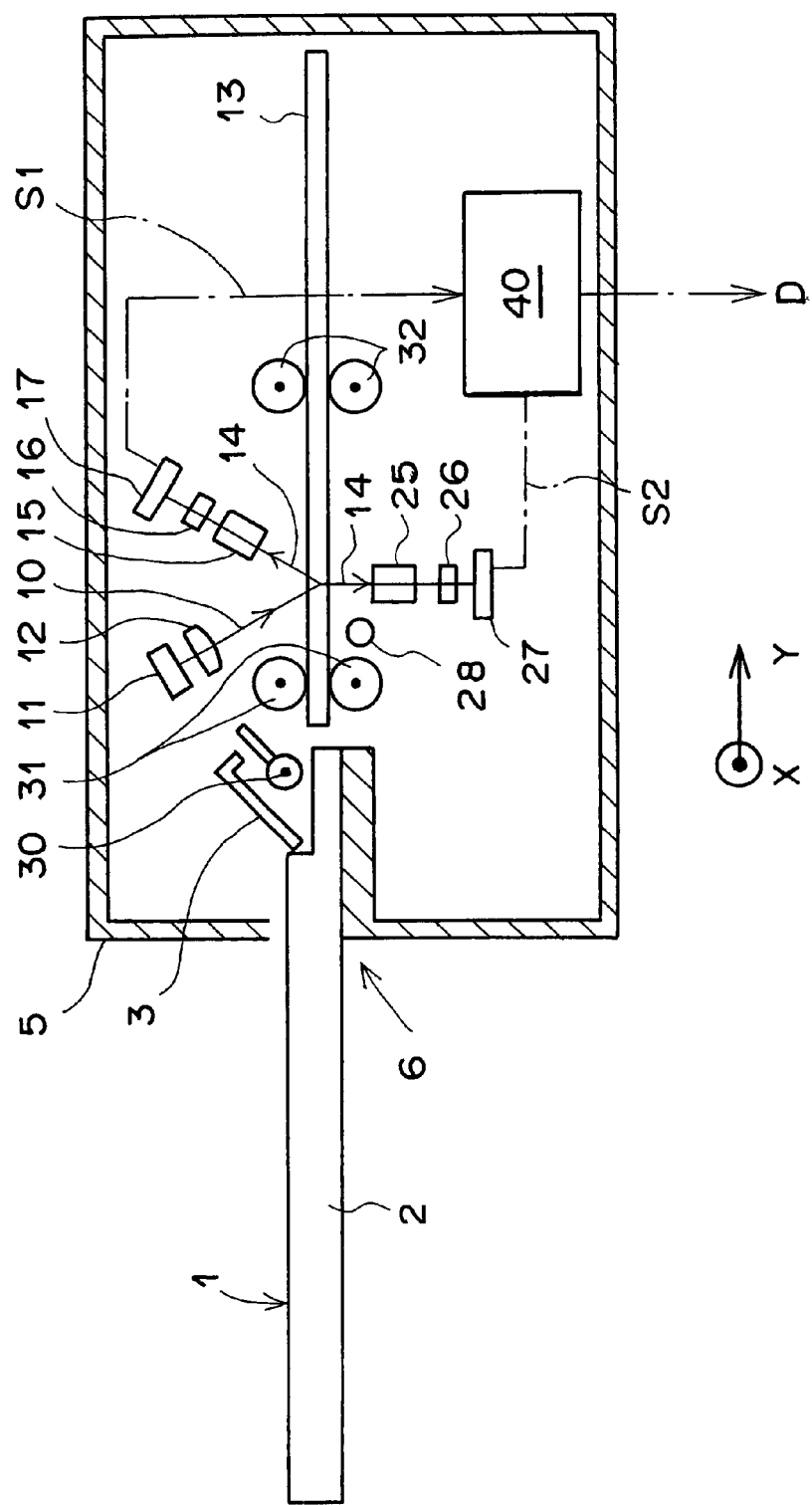
FIG. 1 shows a schematic side view of a radiation image data reading apparatus according to a first embodiment of the present invention.

Hereinafter, the preferred embodiments of the present invention will be described with reference to the drawings. FIG. 1 shows a schematic side view of a radiation image data reading apparatus according to a first embodiment of the present invention. The apparatus of the first embodiment comprises a housing 5 that receives and holds a cassette 1 having a stimulable phosphor sheet therein at a holding portion 6, and a readout portion within said housing 5.

Figure 6:
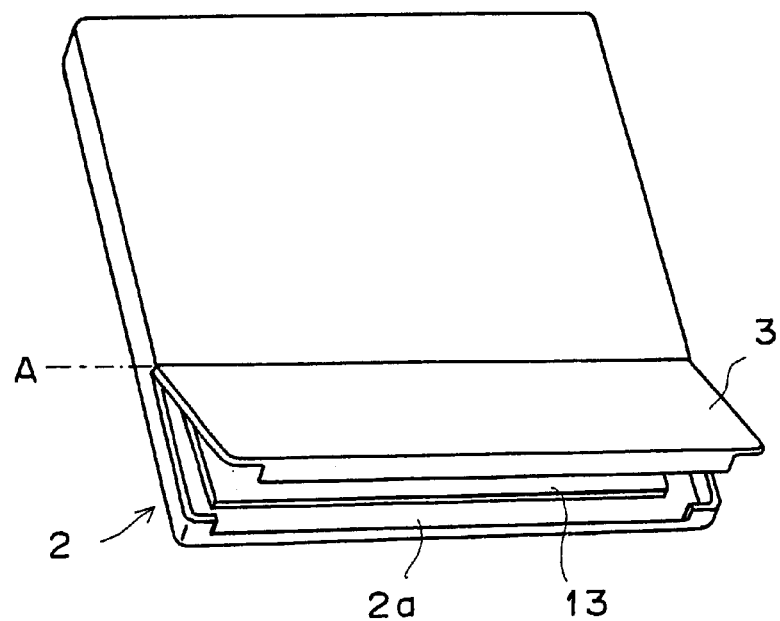
FIG. 6 shows a perspective view of a cassette handled by the apparatus shown in FIG. 1.

Cassette 1, as shown in its entirety in FIG. 6, comprises a thin box portion 2 having an opening 2a for inserting and removing a stimulable phosphor sheet, and a lid portion 3 for opening and closing said opening 2a. The box portion 2 and the lid portion 3 are formed of, for example, synthetic resin. Lid portion 3 is attached to box portion 2 in a manner so that it may swing freely about axis A, and opens and closes opening 2a by its swinging motion. In order for the lid portion 3 to be able to swing freely in the above manner, a known hinge mechanism may be used. Alternatively, the lid portion 3 and the box portion 2 may be made integrally of synthetic resin with a hinge line at where lid portion can be folded in relation to box portion 3.

This cassette 1 having a stimulable phosphor sheet 13 housed therein is placed in a position where it will be irradiated by radiation that has, for example, passed through a subject. By this positioning, the stimulable phosphor sheet 13 is irradiated by said radiation, and a transmitted radiation image of the subject is recorded thereon. The cassette 1, after a radiation image has been recorded on the stimulable phosphor sheet 13 therein, is inserted into apparatus housing 5, the side having the opening 2a first. A holding portion 6 holds the stimulable phosphor sheet in a predetermined position. When the cassette 1 is held in the predetermined position, lid portion 3 is moved by a lid opening/closing means (not shown), and the opening 2a is opened.

The housing 5 is equipped with a light-shielding member (not shown) to preclude the entrance of light thereto from a gap between the cassette 1 and the housing 5 when the cassette 1 is held in the above manner.

Figure 2:
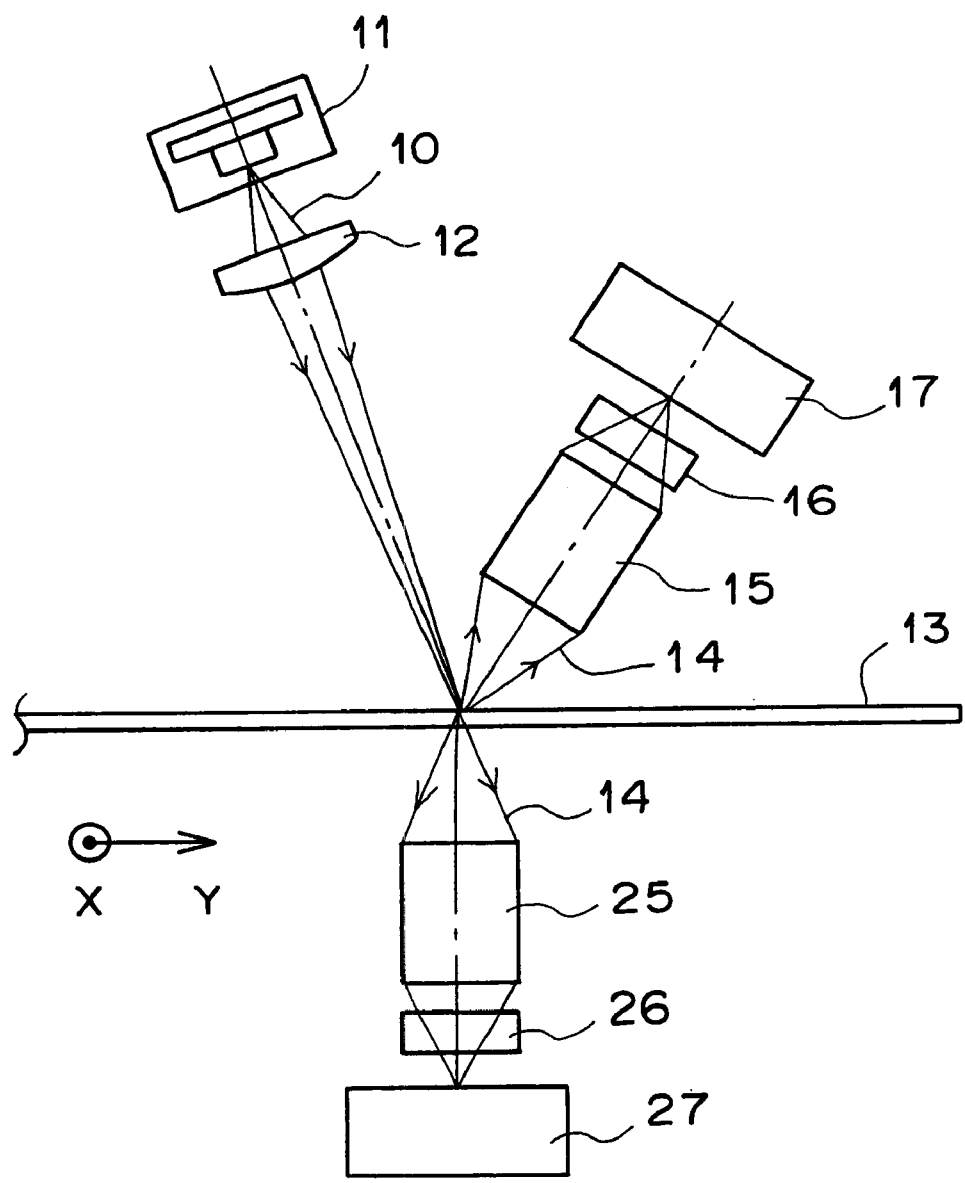
FIG. 2 shows a side view of an optical system comprising the reading unit of the apparatus shown in FIG. 1.
Figure 3:
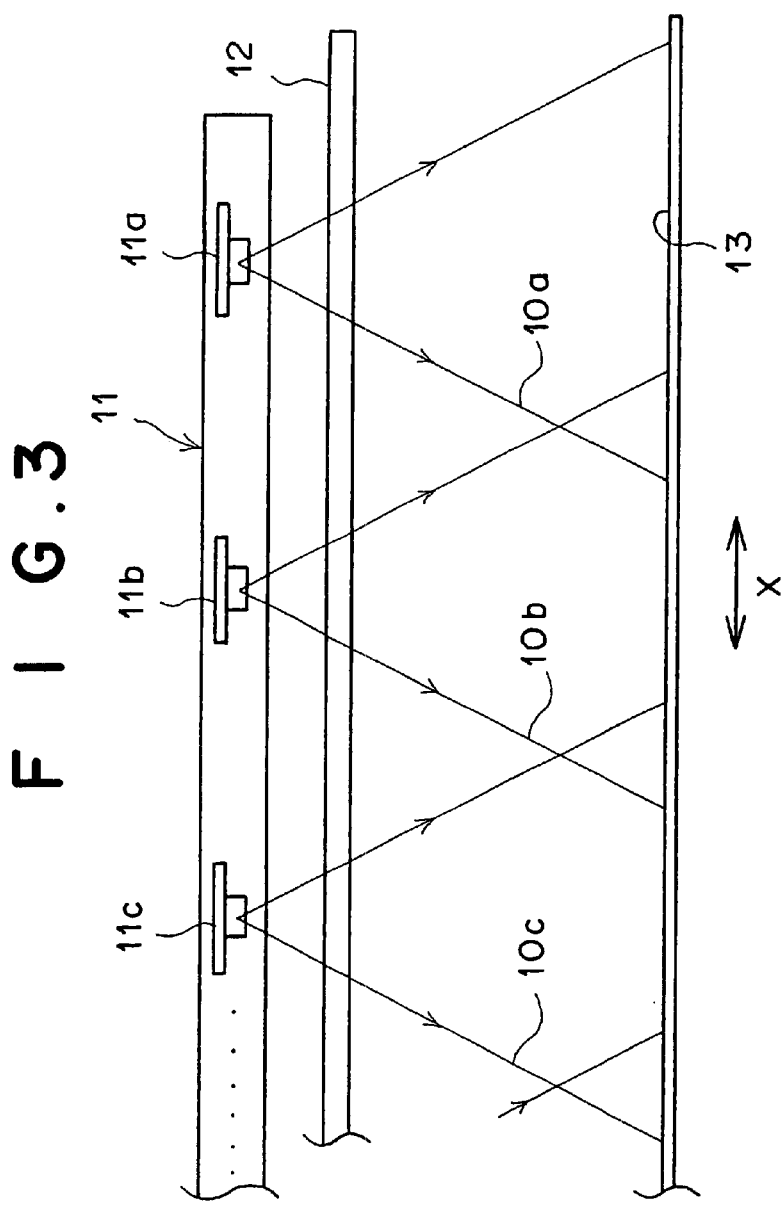
FIG. 3 shows a front view of a line light source utilized by the apparatus shown in FIG. 1.

A reading unit placed with the housing 5 in FIG. 1 will be described hereinafter, with reference to FIG. 2 and FIG. 3, in addition to FIG. 1. FIG. 2 and FIG. 3 show a side view and a front view of an optical system comprising the reading unit in the apparatus shown in FIG. 1, respectively.

The reading unit comprises: a laser diode array 11 as an excitation light main scan means that emits an excitation light 10 in the form of a fan beam; a cylindrical lens 12 for concentrating the excitation light 10 only within the plane as shown in FIG. 2; a first lens array 15 for focusing phosphorescent light 14 emitted to a side of excitation light irradiation from a portion of the stimulable phosphor sheet 13 on which the excitation light 10 has been irradiated linearly (hereinafter referred to as the irradiation area); a first excitation light cutoff filter 16 placed on a path of the phosphorescent light 14 from the lens array 15; and a first CCD line sensor 17 for detecting the phosphorescent light 14 having passed through the cutoff filter 16.

On a side of the stimulable phosphor sheet 13 opposite from the excitation light irradiation side is provided: a second lens array 25 for focusing the phosphorescent light 14; a second excitation light cutoff filter 26 placed on a path of the phosphorescent light 14 from the lens array 25; a second CCD line sensor 27 for detecting the phosphorescent light 14 having passed through the filter 26; and an erasing light source 28 having a length equal to or longer than an entire width of the stimulable phosphor sheet 13 and for emitting light having a wavelength in an excitation wavelength band of the stimulable phosphor sheet 13 (hereinafter referred to as erasing light)

As shown in FIG. 3, the laser diode array 11 comprises a plurality of laser diodes 11a, 11b, 11c . . . forming one line, and having an oscillation wavelength of 650~690 nm. Divergent excitation lights 10a, 10b, 10c . . . emitted from each of the laser diodes 11a, 11b, 11c . . . are unidirectionally focused by the cylindrical lens 12 to form fan beams. The excitation light 10 composed of said fan beams is linearly irradiated on the irradiation area of the sheet 13.

The laser diode array 11 is located close to the opening 2a of the cassette 1 held by the holding portion 6, and emits the excitation light 10 to the sheet 13.

Figure 4:
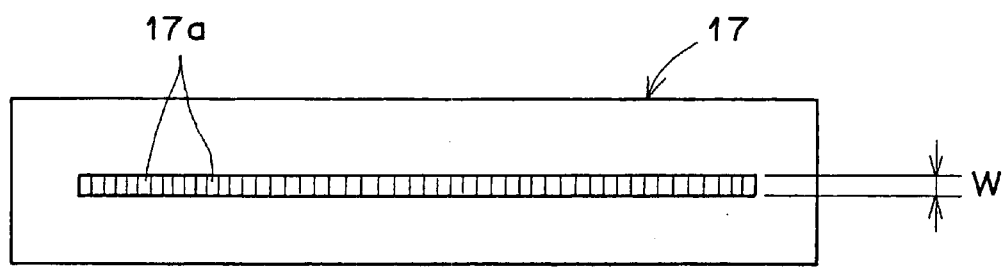
FIG. 4 shows a top view of a line sensor utilized by the apparatus shown in FIG. 1.

The first CCD line sensor 17 comprises a plurality of sensor chips (photoelectric conversion devices) 17a aligned as shown in FIG. 4. In the present example, a light reception width of the first CCD line sensor 17 in a direction perpendicular to an alignment direction of the sensor chips, that is, a width W of the sensor chips 17a, is approximately 100 $\mu$m.

The first CCD line sensor 17 is positioned in such a manner that the sensor chips are aligned along a lengthwise direction (the direction shown by X) of the irradiation area of the sheet 13. The first CCD line sensor 17 may comprise a plurality of CCD line sensors stacked lengthwise in order to deal with the case in which the stimulable phosphor sheet has a large width.

Figure 5:
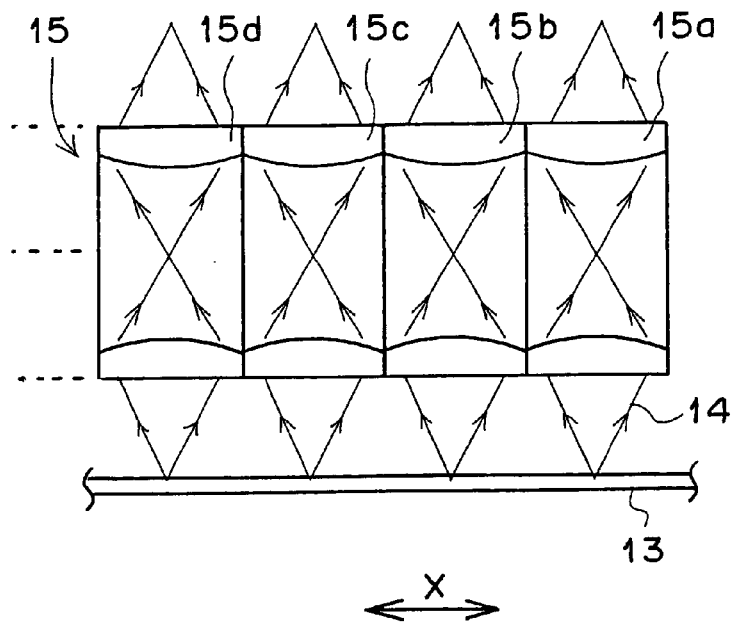
FIG. 5 shows a front view of a light focusing lens array utilized by the apparatus shown in FIG. 1.

The first lens array 15 comprises a plurality of continuous refractive index distribution lenses 15a, 15b, 15c . . . aligned as shown in FIG. 5. The lenses focus the phosphorescent light 14 emitted from the irradiation area of the sheet 13 then lead said light to the first CCD line sensor 17, as shown in FIG. 1.

The second CCD line sensor 27 and the second lens array 25 have the same structure as the first CCD line sensor 17 and the first lens array 15 described above.

An ejection roller 30 for taking out the stimulable phosphor sheet 13 from the cassette 1 is provided in the vicinity of the holding portion 6. The ejection roller 30 enters the cassette 1 from the opening 2a when the opening 2a is opened while said cassette 1 is held by the holding portion 6 in the above manner. The ejection roller 30 is pressed against the sheet 13 and rolls over the sheet in order to take out the sheet 13 from the opening 2a to the outside of the cassette 1.

A pair of nip rollers 31 is placed close to the ejection roller 30, for conveying the sheet 13 to the rightward direction in FIG. 1 by sandwiching the sheet 13. Another pair of nip rollers 32 comprising sheet conveyance means together with the nip rollers 31 is also placed in the direction of conveyance of the sheet 13.

Hereinafter, the operation of the radiation image information reading apparatus constructed as described above will be described. As has been described above, the cassette 1, after a radiation image has been recorded on the stimulable phosphor sheet 13 therein, is set in the apparatus and the sheet 13 is taken out of the cassette 1 by the ejection roller 30.

When the sheet 13 is taken out of the cassette 1, a front end of the sheet 13 is conveyed between the nip rollers 31. At this point the ejection roller 30 moves away from the sheet 13. Thereafter, the sheet 13 is conveyed by the nip rollers 31 at a predetermined speed in a rightward direction (the direction indicated by the arrow Y in FIG. 1). After the sheet 13 is conveyed for a certain distance, the front end is conveyed to the nip rollers 32. Thereafter, the sheet 13 is conveyed between the nip rollers 31 and 32 at the predetermined speed. At this time, the sheet 13 is held from below by a guide part (not shown), thereby maintaining a horizontal orientation thereof while being conveyed.

While the sheet 13 is conveyed at the predetermined speed in the above manner, the excitation light 10 emitted from the laser diode array 11 is irradiated linearly on the irradiation area of the stimulable phosphor sheet 13 so that the sheet is subjected to main scan in the direction indicated by the arrow X. At the same time, the sheet 13 is vertically scanned with the excitation light 10 by its conveyance in the direction of the arrow Y which is perpendicular to the main scan direction. In this manner, the sheet 13 is scanned two-dimensionally with the excitation light 10.

An amount of phosphorescent light 14 corresponding to the radiation image information stored in the sheet 13 is emitted from the area irradiated by the excitation light 10. For example, the blue portion of the phosphorescent light 14 is focused by the first lens array 15 and led to the first CCD line sensor 17 to be detected photoelectrically by said sensor 17. The excitation light 10 reflected by the stimulable phosphor sheet 13 that propagates toward the first CCD line sensor 17 is cut off by the first excitation light cutoff filter 16.

Another portion of the phosphorescent light 14 that has passed through the transparent substrate and propagates toward a side opposite of the excitation light irradiation side is focused by the second lens array 25 and led to the second CCD line sensor 27 to be detected photoelectrically by the sensor 27. The portion of the excitation light 10 that has passed through the stimulable phosphor sheet 13 and propagates toward the second CCD line sensor 27 is cut off by the second excitation light cutoff filter 26.

The first CCD line sensor 17 outputs an analog light detection signal S1 corresponding to an amount of the phosphorescent light 14 (that is, representing the radiation image data). The signal S1 is amplified by a readout circuit 40 and subjected to A/D conversion processing to be converted into a digital image signal. Likewise, the second CCD line sensor 27 outputs an analog light detection signal S2 corresponding to an amount of the phosphorescent light 14. The signal S2 is amplified by the readout circuit 40 and subjected to A/D conversion processing to be converted into a digital image signal.

The reading circuit 40 adds the two digital image signals for each of pixels. An image signal D obtained by this addition is output to outside of the apparatus, and subjected to image processes such as a gradation process, a frequency process, and the like as necessary. Thereafter, the image signal D is sent to image display means such as a CRT display device or an image recording apparatus such as an optical scan recording apparatus. In this manner, an image represented by the image signal D, that is, the radiation image recorded in the stimulable phosphor sheet 13, is reproduced.

After the stimulable phosphor sheet 13 is conveyed to a sub-scan end position and reading of the radiation image information is completed, the nip rollers 31 and 32 are driven in a direction reverse to the direction described above, and the sheet 13 is sent back into the cassette 1. The erasing light source 28 is turned on, and the erasing light emitted from the erasing light source 28 is irradiated on the stimulable phosphor layer through the transparent substrate. When the erasing light, which is in an excitation wavelength range of the stimulable phosphor sheet 13, is irradiated thereon, radiation energy remaining in the stimulable phosphor layer of said sheet 13 is released.

Before the sheet 13 is entirely returned to the cassette 1, the aforementioned erasing light is irradiated on an entire surface of the sheet 13. By this, the sheet 13 returns to a state in which it may be used again for recording further radiation images thereon.

When the sheet 13 is separated from the nip rollers 31, the ejection roller 30 comes in contact with the sheet 13 and driven in a direction reverse to the direction described above. In this manner, the sheet 13 is completely returned to the interior of the cassette 1. The aforementioned lid opening/closing means swings the lid 3 around the hinge and closes the opening 2a. Thereafter, the cassette 1 is taken out from the housing 5 and used for recoding another radiation image.

As has been described above, in this apparatus, the excitation light 10 is irradiated to perform a main scan of the sheet 13 at a position close to the opening 2a of the cassette 1 as the sheet 13 of rigid type is being conveyed from the cassette 1. Meanwhile, a sub-scan is performed on the sheet 13 with the excitation light 10 by the conveyance thereof. Therefore, a space having only the same size as the stimulable phosphor sheet 13 is necessary in the direction of taking out the sheet 13 from the cassette 1, which enables substantial miniaturization of the apparatus.

Furthermore, since the reading apparatus detects phosphorescent light 14 from both sides of the sheet 13, detection efficiency is improved and an image signal D having a good signal to noise ratio can be obtained.

In the radiation image data reading apparatus according to the present embodiment, laser diode array 11 is used as the excitation light main scan means for irradiating the excitation light 10 in the form of a fan beam. Therefore, compared to a case in which a single deflected excitation light beam performs a main scan on the stimulable phosphor sheet 13, the necessity of providing a large space for the deflection of the excitation light beam is obviated, which is further advantageous in terms of miniaturization of the reading apparatus.

Moreover, CCD line sensors 17 and 27 are used as the photoelectric detection means in the radiation image data reading apparatus of the present embodiment. By this construction, compared to a case in which a large light collector is utilized to collect the emitted phosphorescent light then said light is guided to an photoelectric detection means such as a photo multiplier, the structure of the phosphorescent emitted light photoelectric detection portion is simplified, which makes further miniaturization possible.

However, not only a linear light source such as the laser diode array 11 but also a configuration in which the stimulable phosphor sheet 13 is subjected to the main scan by a single excitation light beam deflected in the manner described above may be adopted. Furthermore, a photo multiplier or the like may also be used as the photoelectric detection means.

Figure 7:
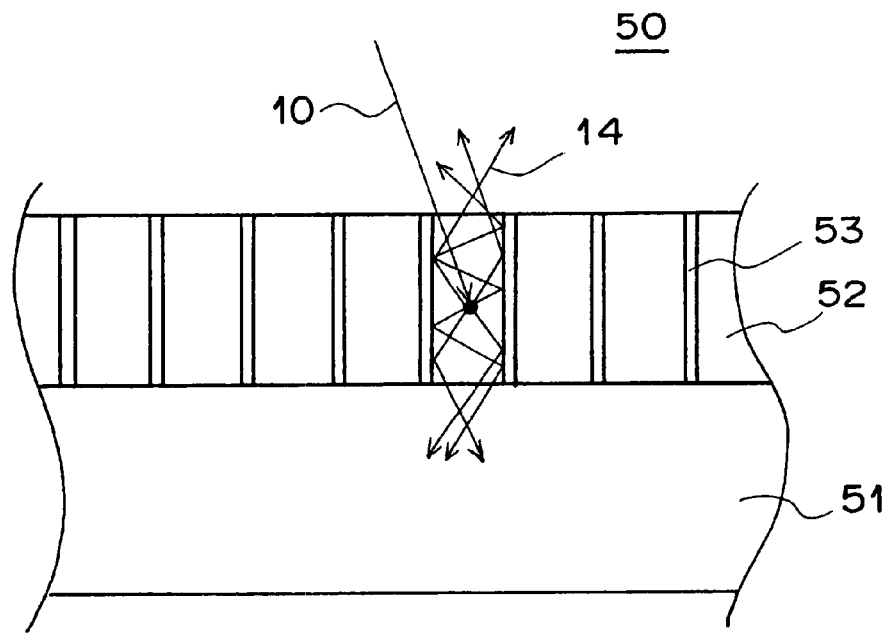
FIG. 7 shows schematic side sectional view of an alternate example of a stimulable phosphor sheet utilized by the radiation image data reading apparatus of the present invention.

In the case where a line sensor having a narrow light reception surface is used as the photoelectric detection means to detect the phosphorescent light 14 as in the embodiment described above, it is preferable for an anisotropic stimulable phosphor sheet to be used as the stimulable phosphor sheet. FIG. 7 shows a sectional view of an example of such a stimulable phosphor sheet. The stimulable phosphor sheet 50 shown in FIG. 7 has a stimulable phosphor layer 52 formed on a substrate 51. The stimulable phosphor layer 52 is divided in a plurality of minute cells by reflective partitioning material 53 that reflects phosphorescent light 14, extending in a thickness direction of the sheet.

If the stimulable phosphor sheet 50 having the above configuration is used for the apparatus shown in FIG. 1, the phosphorescent light 14 emitted from the irradiation area of the sheet 50 is reflected repeatedly by the reflective partitioning material 53 and propagates toward a surface of the sheet. Therefore, the light 14 does not dissipate within the sheet, that is, in a direction crossing the thickness direction thereof. Accordingly, the phosphorescent light 14 can be led efficiently to the light reception surface of the photoelectric detection means even if a line sensor having a narrow light reception surface is used as the photoelectric detection means. In this manner, the light detection efficiency is improved and it becomes possible to reproduce a radiation image of high quality.

If the reflective partitioning material 53 described above is formed to reflect excitation light 10 as well, further preferable results can be obtained. That is, if the spread of excitation light 10 within the sheet is suppressed, a blur in the image due to the phosphorescent emission from an area other than a predetermined scanning area caused by the spread of the excitation light can be prevented.

As the anisotropic stimulable phosphor sheet, aside from the sheet having anisotropy caused by the reflective partitioning material 53, a stimulable phosphor sheet having stimulable phosphors of the columnar crystal type can be used. In such a stimulable phosphor sheet, columnar crystals are extended in the thickness direction of the sheet and the excitation light and/or the phosphorescent light is reflected repeatedly by surfaces of the crystals.

Figure 8:
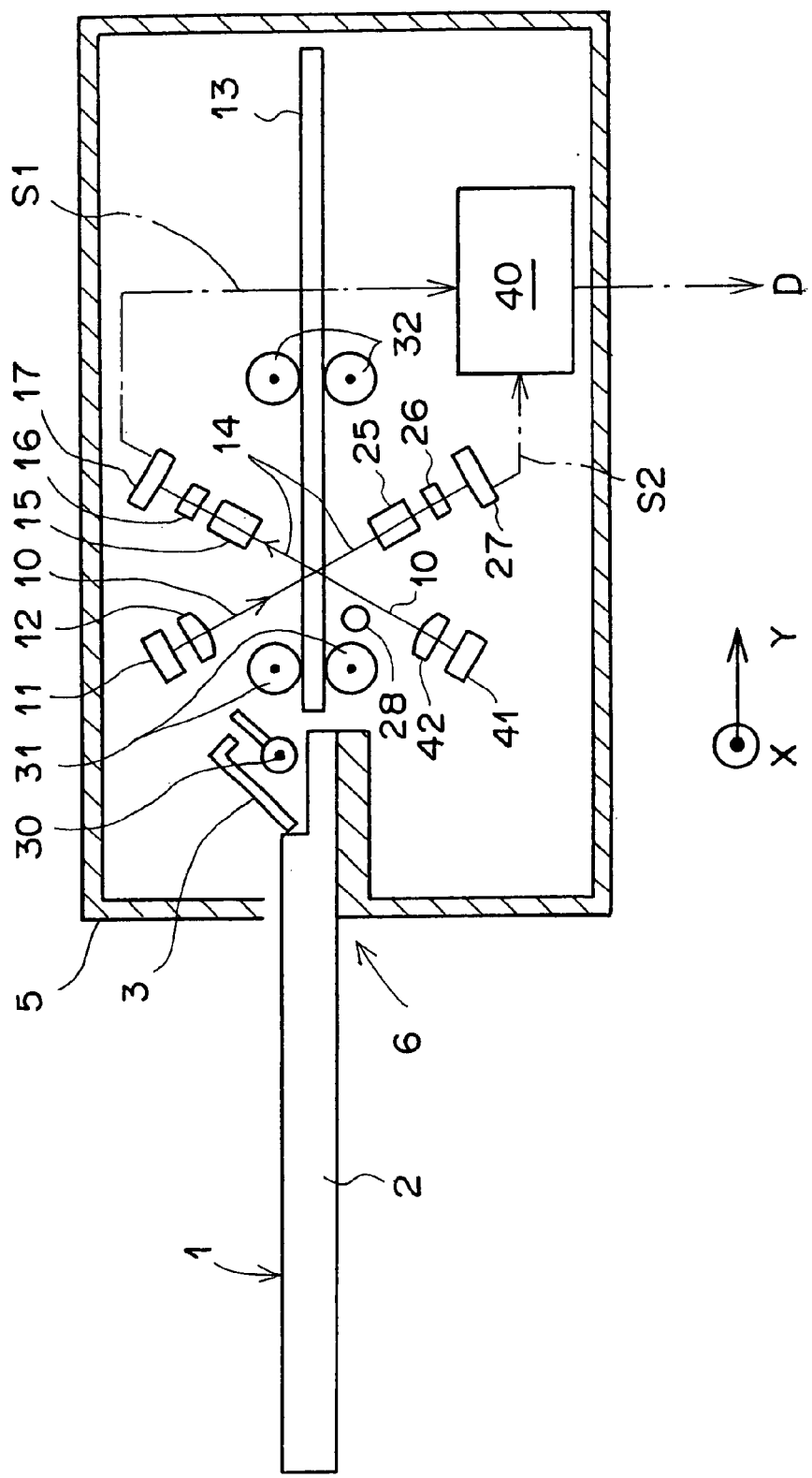
FIG. 8 shows a schematic side view of a radiation image data reading apparatus according to a second embodiment of the present invention.

Next, a radiation image data reading apparatus according to a second embodiment of the present invention will be described. FIG. 8 is a schematic side view showing the radiation image data reading apparatus according to the second embodiment of the present invention. Note that in FIG. 8, elements that are the same as those in FIG. 1 have been labeled with the same reference numerals, and insofar as it is not necessary, descriptions thereof have been omitted.

The radiation image data reading apparatus according to the second embodiment basically differs from that shown in FIG. 1 in that, in addition to a excitation light main scan means comprising laser diode array 11 and cylindrical lens 12, another excitation light main scan means comprising a laser diode array 41 and a cylindrical lens 42 is provided on the other side of the stimulable phosphor sheet 13, so that said sheet 13 is sandwiched between the two excitation light main scan means.

The present apparatus is configured so that excitation light 10 emitted from each of the aforementioned laser diode array 11 and laser diode array 42 is irradiated on the same portion of stimulable phosphor sheet 13. The phosphorescent light 14 emitted from the stimulable phosphor sheet 13 by the irradiation thereof by excitation light 10 is detected by first CCD line sensor 17 and second CCD line sensor 27 as in the first embodiment.

If the same portion of stimulable phosphor sheet 13 is excited from both sides thereof, the excitation efficiency is improved, and an improvement in the read out radiation image is obtained as a result.

Figure 9:
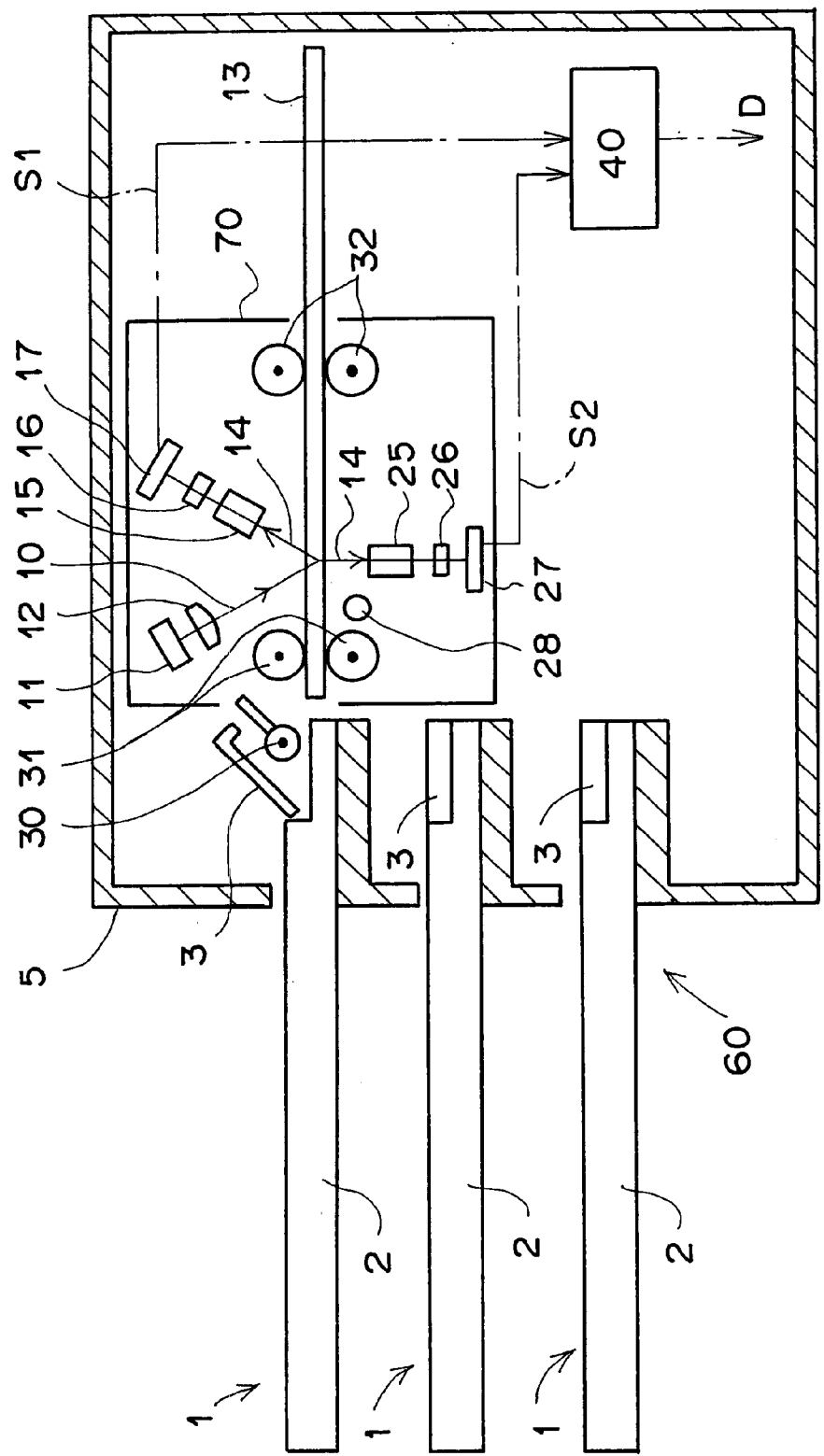
FIG. 9 shows a schematic side view of a radiation image data reading apparatus according to a third embodiment of the present invention.

Next, a radiation image data reading apparatus according to a third embodiment of the present invention will be described. FIG. 9 is a schematic side view showing the radiation image data reading apparatus according to the third embodiment of the present invention. The radiation image data reading apparatus of the third embodiment basically differs from that shown in FIG. 1 in that all of the elements that constitute the readout portion within housing 5 are mounted on a vertical motion unit 70, while a holding portion 60 that receives and holds three cassettes in a vertically stacked orientation is formed on housing 5.

A maximum of three cassettes 1 having stimulable phosphor sheets 13 therein on which a radiation image has been recorded can be set in this apparatus. As shown in the figure, the vertical motion unit 70 is initially set in a position to remove stimulable phosphor sheet 13 from the uppermost cassette 1, then to perform readout of the radiation image data therefrom. In this state, the radiation image data readout process as well as the following erasing process is performed in a similar manner as in the first embodiment.

When the radiation image data readout process is completed on stimulable phosphor sheet 13 and said sheet 13 is returned to the interior of the cassette 1, vertical motion unit 70 moves downward a distance equal to the positioning pitch of the three cassettes 1. That is, vertical motion unit 70 is set in a position to remove stimulable phosphor sheet 13 from the second uppermost cassette 1, then to perform readout of the radiation image data therefrom at this time. In this state, the radiation image data readout process as well as the following erasing process is performed on the stimulable phosphor sheet 13 stored in the second uppermost cassette 1. After said processes are completed, said stimulable phosphor sheet 13 is returned to the interior of the second uppermost cassette 1.

Then, the vertical motion unit 70 moves downward a distance equal to the positioning pitch of the three cassettes 1. That is, vertical motion unit 70 is set in a position to remove stimulable phosphor sheet 13 from the lowermost cassette 1, then to perform readout of the radiation image data therefrom at this time. In this state, the radiation image data readout process as well as the following erasing process is performed on the stimulable phosphor sheet 13 stored in the lowermost cassette 1. After said processes are completed, said stimulable phosphor sheet 13 is returned to the interior of the lowermost cassette 1.

As has been described above, the radiation image data reading apparatus according to the third embodiment obviates the necessity to remove and install cassettes 1 one by one from and to the apparatus when it is desired to read out radiation image data from each of three cassettes 1. That is, it becomes possible to read out radiation image data from each stimulable phosphor sheet 13 housed within the three cassettes 1 all together, thus realizing a more efficient readout process.

Note that in the case that a structure for holding a plurality of cassettes is adopted, the number of cassettes to be held is not limited to three. The effect described above can be obtained if the number of cassettes to be held is two or greater.

What is claimed is:

1. A radiation image data reading apparatus that receives a cassette that houses a substantially inflexible stimulable phosphor sheet with high rigidity therein with an opening at an end portion thereof for inserting and removing said sheet having radiation image data recorded thereon and reads out radiation image data from said stimulable phosphor sheet which has been removed from said cassette comprising:

a sheet conveyance means that conveys said 10 stimulable phosphor sheet from the opening of said received cassette at a constant speed, at least during the readout of radiation image data;

an excitation light main scan means that scans the stimulable phosphor sheet as it is being removed from said cassette with an excitation light in an excitation wavelength region of said sheet in a direction substantially perpendicular to a conveyance direction, at a position in a vicinity of said opening; and a photoelectric detection means that detects a phosphorescent light emitted from a portion of said sheet irradiated by the excitation light.

2. A radiation image data reading apparatus as defined in claim 1, wherein said excitation light main scan means irradiates said stimulable phosphor sheet with the excitation light in a form of a fan beam.

3. A radiation image data reading apparatus as defined in claim 2, wherein said photoelectric detection means comprises a line sensor.

4. A radiation image data reading apparatus as defined in claim 3, wherein said photoelectric detection means comprises a first photoelectric detection means that detects the phosphorescent light emitted from the portion of the stimulable phosphor sheet irradiated by the excitation light from one side of said sheet, and a second photoelectric detection means that detects said phosphorescent light from an other side of said sheet.

5. A radiation image data reading apparatus as defined in claim 4, wherein said excitation light main scan means comprises a first excitation light main scan means that irradiates a stimulable phosphor sheet with the excitation light from one side thereof, and a second excitation light main scan means that irradiates said sheet from the other side thereof.

6. A radiation image data reading apparatus as defined in claim 5, wherein an anisotropic stimulable phosphor sheet that restricts a spreading of the excitation light and/or the phosphorescent light within said sheet is utilized as the stimulable phosphor sheet.

7. A radiation image data reading apparatus as defined in claim 4, wherein an anisotropic stimulable phosphor sheet that restricts a spreading of the excitation light and/or the phosphorescent light within said sheet is utilized as the stimulable phosphor sheet.

8. A radiation image data reading apparatus as defined in claim 3, wherein said excitation light main scan means comprises a first excitation light main scan means that irradiates a stimulable phosphor sheet with the excitation light from one side thereof, and a second excitation light main scan means that irradiates said sheet from an other side thereof.

9. A radiation image data reading apparatus as defined in claim 8, wherein an anisotropic stimulable phosphor sheet that restricts a spreading of the excitation light and/or the phosphorescent light within said sheet is utilized as the stimulable phosphor sheet.

10. A radiation image data reading apparatus as defined in claim 3, wherein an anisotropic stimulable phosphor sheet that restricts a spreading of the excitation light and/or the phosphorescent light within said sheet is utilized as the stimulable phosphor sheet.

11. A radiation image data reading apparatus as defined in claim 2, wherein said photoelectric detection means comprises a first photoelectric detection means that detects the phosphorescent light emitted from the portion of the stimulable phosphor sheet irradiated by the excitation light from one side of said sheet, and a second photoelectric detection means that detects said phosphorescent light from an other side of said sheet.

12. A radiation image data reading apparatus as defined in claim 11, wherein said excitation light main scan means comprises a first excitation light main scan means that irradiates a stimulable phosphor sheet with the excitation light from one side thereof, and a second excitation light main scan means that irradiates said sheet from the other side thereof.

13. A radiation image data reading apparatus as defined in claim 12, wherein an anisotropic stimulable phosphor sheet that restricts a spreading of the excitation light and/or the phosphorescent light within said sheet is utilized as the stimulable phosphor sheet.

14. A radiation image data reading apparatus as defined in claim 11, wherein an anisotropic stimulable phosphor sheet that restricts a spreading of the excitation light and/or the phosphorescent light within said sheet is utilized as the stimulable phosphor sheet.

15. A radiation image data reading apparatus as defined in claim 2, wherein said excitation light main scan means comprises a first excitation light main scan means that irradiates a stimulable phosphor sheet with the excitation light from one side thereof, and a second excitation light main scan means that irradiates said sheet from an other side thereof.

16. A radiation image data reading apparatus as defined in claim 15, wherein an anisotropic stimulable phosphor sheet that restricts a spreading of the excitation light and/or the phosphorescent light within said sheet is utilized as the stimulable phosphor sheet.

17. A radiation image data reading apparatus as defined in claim 2, wherein an anisotropic stimulable phosphor sheet that restricts a spreading of the excitation light and/or the phosphorescent light within said sheet is utilized as the stimulable phosphor sheet.

18. A radiation image data reading apparatus as defined in claim 1, wherein said photoelectric detection means comprises a line sensor.

19. A radiation image data reading apparatus as defined in claim 18, wherein said photoelectric detection means comprises a first photoelectric detection means that detects the phosphorescent light emitted from the portion of the stimulable phosphor sheet irradiated by the excitation light from one side of said sheet, and a second photoelectric detection means that detects said phosphorescent light from an other side of said sheet.

20. A radiation image data reading apparatus as defined in claim 19, wherein said excitation light main scan means comprises a first excitation light main scan means that irradiates a stimulable phosphor sheet with the excitation light from one side thereof, and a second excitation light main scan means that irradiates said sheet from the other side thereof.

21. A radiation image data reading apparatus as defined in claim 20, wherein an anisotropic stimulable phosphor sheet that restricts a spreading of the excitation light and/or the phosphorescent light within said sheet is utilized as the stimulable phosphor sheet.

22. A radiation image data reading apparatus as defined in claim 19, wherein an anisotropic stimulable phosphor sheet that restricts a spreading of the excitation light and/or the phosphorescent light within said sheet is utilized as the stimulable phosphor sheet.

23. A radiation image data reading apparatus as defined in claim 18, wherein said excitation light main scan means comprises a first excitation light main scan means that irradiates a stimulable phosphor sheet with the excitation light from one side thereof, and a second excitation light main scan means that irradiates said sheet from an other side thereof.

24. A radiation image data reading apparatus as defined in claim 23, wherein an anisotropic stimulable phosphor sheet that restricts a spreading of the excitation light and/or the phosphorescent light within said sheet is utilized as the stimulable phosphor sheet.

25. A radiation image data reading apparatus as defined in claim 18, wherein an anisotropic stimulable phosphor sheet that restricts a spreading of the excitation light and/or the phosphorescent light within said sheet is utilized as the stimulable phosphor sheet.

26. A radiation image data reading apparatus as defined in claim 18 further comprising a means for focusing the phosphorescent light onto the line sensor.

27. A radiation image data reading apparatus as defined in claim 26, wherein the line sensor is a CCD line sensor.

28. A radiation image data reading apparatus as defined in claim 27, wherein the CCD line sensor extends substantially in a main scanning direction at a length substantially equal to a length of the stimulable phosphor sheet in a main scanning direction.

29. A radiation image data reading apparatus as defined in claim 1, wherein said photoelectric detection means comprises a first photoelectric detection means that detects the phosphorescent light emitted from the portion of the stimulable phosphor sheet irradiated by the excitation light from one side of said sheet, and a second photoelectric detection means that detects said phosphorescent light from an other side of said sheet.

30. A radiation image data reading apparatus as defined in claim 29, wherein said excitation light main scan means comprises a first excitation light main scan means that irradiates a stimulable phosphor sheet with the excitation light from one side thereof, and a second excitation light main scan means that irradiates said sheet from an other side thereof.

31. A radiation image data reading apparatus as defined in claim 30, wherein an anisotropic stimulable phosphor sheet that restricts a spreading of the excitation light and/or the phosphorescent light within said sheet is utilized as the stimulable phosphor sheet.

32. A radiation image data reading apparatus as defined in claim 29, wherein an anisotropic stimulable phosphor sheet that restricts a spreading of the excitation light and/or the phosphorescent light within said sheet is utilized as the stimulable phosphor sheet.

33. A radiation image data reading apparatus as defined in claim 1, wherein said excitation light main scan means comprises a first excitation light main scan means that irradiates a stimulable phosphor sheet with the excitation light from one side thereof, and a second excitation light main scan means that irradiates said sheet from an other side thereof.

34. A radiation image data reading apparatus as defined in claim 33, wherein an anisotropic stimulable phosphor sheet that restricts a spreading of the excitation light and/or the phosphorescent light within said sheet is utilized as the stimulable phosphor sheet.

35. A radiation image data reading apparatus as defined in claim 1, wherein an anisotropic stimulable phosphor sheet that restricts a spreading of the excitation light and/or the phosphorescent light within said sheet is utilized as the stimulable phosphor sheet.

36. A radiation image data reading apparatus as defined in claim 1 further comprising a cassette holding portion for receiving a plurality of cassettes in a row and a shift means shifting a relative position of the sheet conveyance means and the photoelectric detection means as a unit with respect to the aforementioned plurality of cassettes received in said cassette holding portion, wherein by shifting, the radiation image data is read from one stimulable phosphor sheet conveyed from each cassette of the plurality of cassettes.

37. A radiation image data reading apparatus as defined in claim 36, wherein the shift means shifts the sheet conveyance means, the photoelectric detection means, and the excitation light main scanning means as the unit.

38. A radiation image data reading apparatus as defined in claim 37 further comprising an erasing means, wherein the shift means shifts the sheet conveyance means, the photoelectric detection means, the excitation light main scan means, and the erasing means as the unit.

39. A radiation image data reading apparatus as defined in claim 1, wherein the excitation light main scan means comprises a laser diode array.

40. A radiation image data reading apparatus as defined in claim 39, wherein the laser diode array extends substantially in a main scanning direction.

41. A radiation image data reading apparatus as defined in claim 40, wherein the excitation light main scan means further comprises a cylindrical lens unidirectionally focusing the excitation light from said laser diode array into a plane substantially parallel to the main scanning direction, at the stimubale phosphor sheet.

42. A radiation image data reading apparatus as defined in claim 1, wherein a width of the excitation light at the stimulable phosphor sheet is one of substantially equivalent to and greater than a length of the stimulable phosphor sheet in a main scanning direction.

43. A radiation image data reading apparatus as defined in any one of claims 1 through 6 further comprising a cassette holding portion for receiving a plurality of cassettes in a row and a shift means for shifting a relative position between the sheet conveyance means, the excitation light main scan means as well as the photoelectric detection means and the aforementioned plurality of cassettes received in said cassette holding portion, wherein by shifting said relative position, it becomes possible to read out radiation image data from each of the stimulable phosphor sheets sequentially conveyed from said plurality of cassettes.

* * * * *